United States Patent
Porter et al.

(10) Patent No.: US 10,718,440 B2
(45) Date of Patent: Jul. 21, 2020

(54) CHECK VALVE FOR A SEAFARING VESSEL

(71) Applicants: Brian Porter, Fontana, WI (US); David Navin, Fontana, WI (US)

(72) Inventors: Brian Porter, Fontana, WI (US); David Navin, Fontana, WI (US)

( * ) Notice: Subject to any disclaimer, the term of this patent is extended or adjusted under 35 U.S.C. 154(b) by 33 days.

(21) Appl. No.: 16/156,174

(22) Filed: Oct. 10, 2018

(65) Prior Publication Data

US 2020/0116267 A1 Apr. 16, 2020

(51) Int. Cl.
*B63B 13/02* (2006.01)
*F16K 15/04* (2006.01)

(52) U.S. Cl.
CPC .............. *F16K 15/04* (2013.01); *B63B 13/02* (2013.01)

(58) Field of Classification Search
CPC .................................. B63B 13/02; F16K 15/04
See application file for complete search history.

(56) References Cited

U.S. PATENT DOCUMENTS

| | | | | |
|---|---|---|---|---|
| 4,542,373 A * | 9/1985 | Hillock | ................... | B63B 13/02 114/197 |
| 6,237,639 B1 * | 5/2001 | Jougla | ..................... | B63B 13/00 114/197 |
| 6,357,376 B1 * | 3/2002 | Purio | ..................... | B63B 13/00 114/183 R |
| 6,928,943 B1 * | 8/2005 | Neubauer | ............... | B63B 13/00 114/197 |
| 6,973,891 B1 * | 12/2005 | Warner | ................... | B63B 13/00 114/197 |
| 7,341,015 B2 * | 3/2008 | Bourret | .................. | B63B 13/00 114/183 R |
| 8,365,769 B2 * | 2/2013 | Nimberger | ............ | F16K 5/0605 137/614 |
| 9,217,343 B2 * | 12/2015 | Rice | .................... | F01M 13/0011 |
| 9,849,937 B1 * | 12/2017 | Overbey | ................ | B63B 13/02 |
| 10,208,864 B1 * | 2/2019 | Turan | ........................ | F16J 1/00 |
| 10,464,640 B1 * | 11/2019 | Alrujaib | ................. | B63B 43/02 |
| 2009/0050043 A1 * | 2/2009 | Alvarez | .................. | B63B 13/00 114/197 |
| 2010/0300343 A1 * | 12/2010 | Wise | ....................... | B63B 13/00 114/197 |
| 2011/0259255 A1 * | 10/2011 | Pitts | ........................ | B63B 13/00 114/197 |
| 2014/0090589 A1 * | 4/2014 | Sarnowski | ............. | B63B 13/02 114/182 |

OTHER PUBLICATIONS

Blowsion. Site accessed Nov. 15, 2018. https://www.blowsion.com/products/hull-components/bilge/one-way-valves?dir=desc&manufacturer=18&mode=list&order=name.
Gandoor Outdoors. Site accessed Nov. 15, 2018 https://www.ganderoutdoors.com/product/details?pdesc=Drain-Plug-Receiver-Kit&i=314631.

* cited by examiner

*Primary Examiner* — Lars A Olson
*Assistant Examiner* — Jovon E Hayes
(74) *Attorney, Agent, or Firm* — Whitmyer IP Group LLC

(57) ABSTRACT

A check valve for a vessel having at least one port for a buoyancy chamber. The check valve having a valve body fitted to sealingly engage the port and a stopper retained within the valve body and be moveable from a closed position limiting water from entering the port to an open position permitting drainage of water from the port.

20 Claims, 8 Drawing Sheets

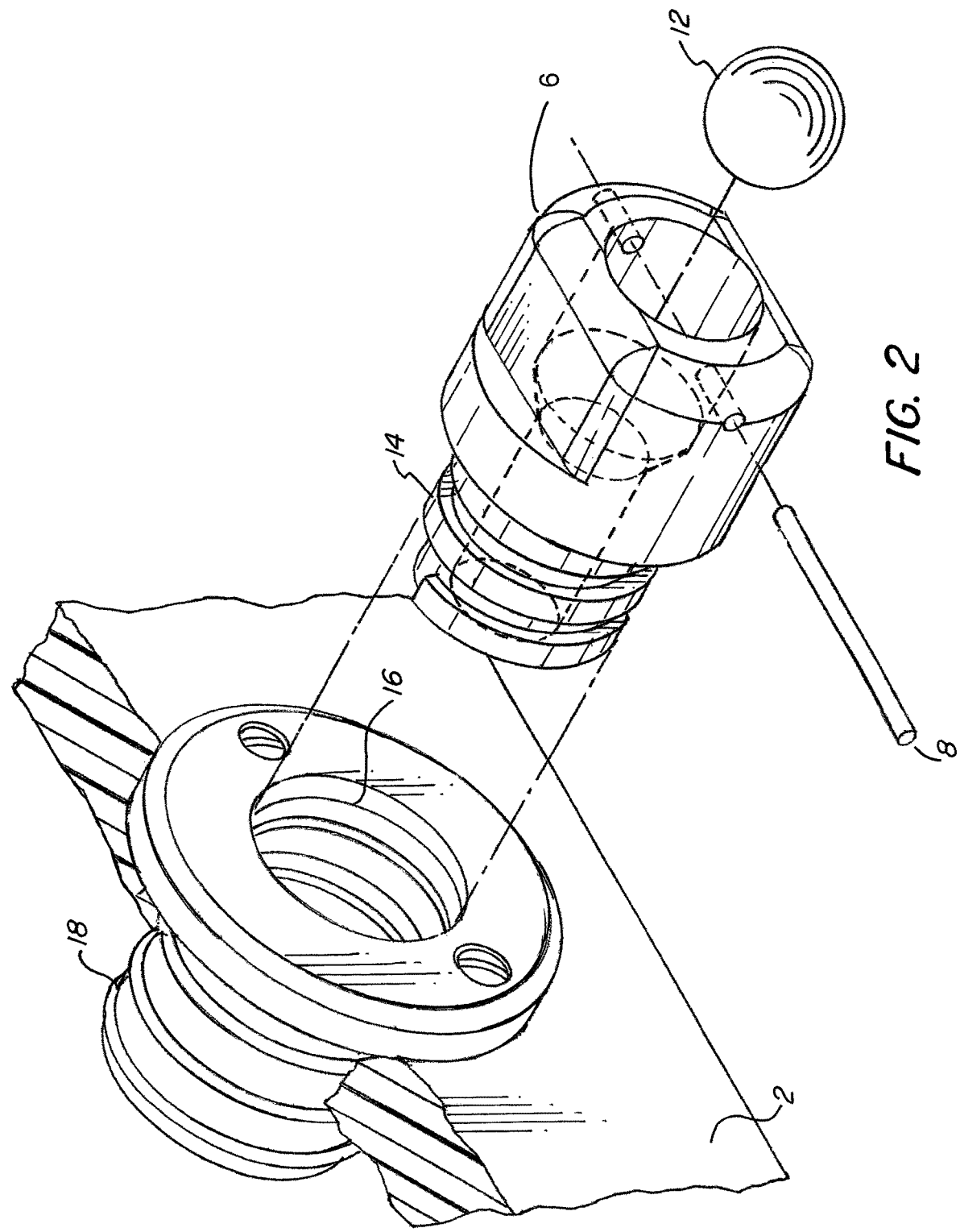

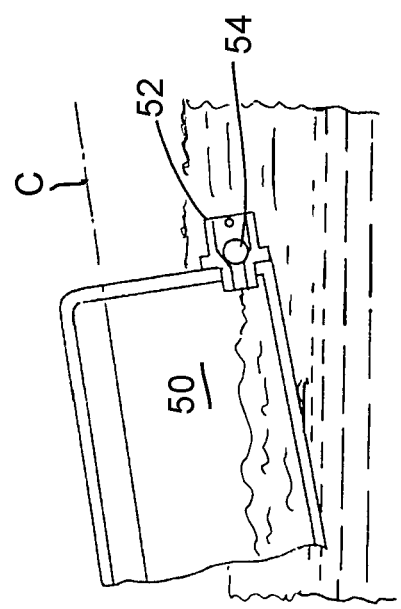

CHECK VALVE FOR A SEAFARING VESSEL

TECHNICAL FIELD

The present teachings relate generally to a check valve for a vessel capable of allowing water to drain from the vessel but not enter it.

BACKGROUND

Vessels such as power boats, scows, canoes, and kayaks regularly take on water in the hull and various compartments within the vessel from splashing, heeling, and rain. This water can affect balance and performance of the vessel. In order to drain this water, drain plugs and ports have been fitted into hulls and compartments. Some of these plugs use threaded adaptors which then accept a male plug. The male plugs must be removed to allow the collected water to drain and plugged back in afterwards.

Users often lose the male portion of the plug after removing it. To solve this problem manufactures have begun attaching the male portion to the adapter with tethers that fit inside the adapter. However, users must still remember to the plug back. The plugs must be replaced quickly when the vessel keels from one side to another. As the vessel keels to the starboard side, the male plug on the port side is removed to drain the water, but must be quickly replaced as the vessel can keel to the port side very quickly. If the plug is not timely replaced all the water will flow back into the compartment.

Therefore, it would be beneficial to have an alternative system for draining water from a vessel that does not require the removal of parts.

SUMMARY

The needs set forth herein as well as further and other needs and advantages are addressed by the present embodiments, which illustrate solutions and advantages described below.

The system can include a check valve for a port of a vessel, a valve body fitted to the port and a stopper within valve body moveable from a first position limiting water from entering the port to a second position permitting drainage of water from the port. The stopper can be moveable between positions by gravity or hydrostatic pressure.

Another benefit of an embodiment of the present disclosure is having the check valve include a threaded surface. The threaded surface can be used for sealingly engaging the port or a female adapter placed in the port. A drain plug can be removed from the port and replaced with the check valve.

Yet another benefit of an embodiment of the present disclosure is having the stopper be retained in the valve by a pin.

Yet another benefit of an embodiment of the present disclosure is having the valve body be a unitary piece.

Yet another benefit of an embodiment of the present disclosure is having the valve body include at least two inner diameters. The two inner diameters can also be concentric.

Yet another benefit of an embodiment of the present disclosure is having the stopper be a ball.

Yet another benefit of an embodiment of the present disclosure is having an outer surface of the stopper seal to an inner surface of the valve body in the first position. The stopper can also seal to a shoulder surface within the valve body.

Yet another benefit of an embodiment of the present disclosure is having the stopper be denser than water.

Yet another benefit of an embodiment of the present disclosure is having the stopper be less dense than water. The stopper can then be moveable by flotation.

Yet another benefit of an embodiment of the present disclosure is having the valve body further include an outer portion including at least a pair of opposing extended planes.

Other embodiments of the check valve are described in detail below and are also part of the present teachings.

For a better understanding of the present embodiments, together with other and further aspects thereof, reference is made to the accompanying drawings and detailed description, and its scope will be pointed out in the appended claims.

BRIEF DESCRIPTION OF THE DRAWINGS

FIG. 2 is an exploded view of an embodiment the check valve.

FIG. 5a-c is a cut away view of a vessel in motion with an embodiment of the check valve in use.

DETAILED DESCRIPTION

The present teachings are described more fully hereinafter with reference to the accompanying drawings, in which the present embodiments are shown. The following description is presented for illustrative purposes only and the present teachings should not be limited to these embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

For a better understanding of the present embodiments, together with other and further aspects thereof, reference is made to the accompanying drawings and detailed description, and its scope will be pointed out in the appended claims.

Figure 1:
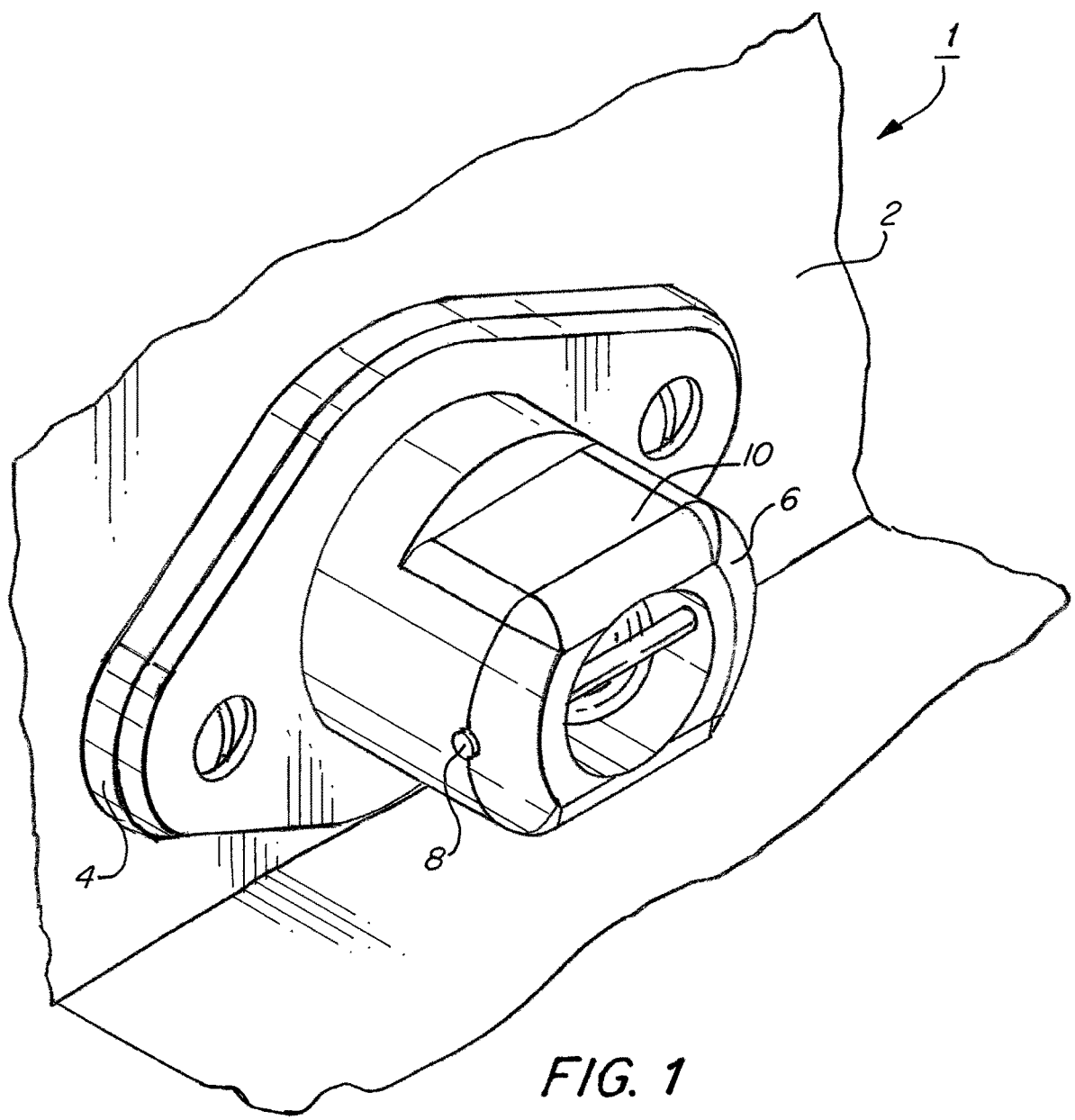
FIG. 1 is an orthogonal view of an embodiment the check valve.

FIG. 1 shows check valve 1 for a port of a vessel 2 including valve body 6 fitted to the port and a stopper 12 within valve body 6 moveable from a first position limiting water from entering the port to a second position permitting drainage of water from the port. Stopper 12 can be a ball, ensuring it can move easily within the valve body 6. Stopper 12 can be retained in the valve 6 by pin 8. Pin 8 can be installed to be press fit, epoxied, or glued to ensure that it does not become removed unexpectedly and does not have to be replaced. Valve body 6 can be a unitary piece further ensuring that easy installation and care. Valve body 6 can be made of a Black Delrin material. The material makes fine machining of the check valve much easier due to its plasticity, while also improving on the resiliency of valve body 6. The material further improves valve body's 6 interaction with the vessel in the water when compared with standard drain valves. Valve body 6 further includes an outer portion including at least a pair of opposing extended planes 10, which allow for easy installation of the of the valve with a hand or a wrench.

As seen in FIG. 2, valve body 6 can include a threaded surface 14. Threaded surface 14 can be used for sealingly engaging the port or engaging a female portion (adapter) of valve 4. When being installed, an existing drain plug can be removed from the port and replaced with valve body 6. Valve body 6 can be installed in any port of a vessel. The port can lead overboard or to an internal compartment or to a chamber of the vessel. By allowing water to drain, the vessel can improve balance and performance. The valve can be installed in a variety of positions and orientations as seen in subsequent Figures.

Figure 3A:
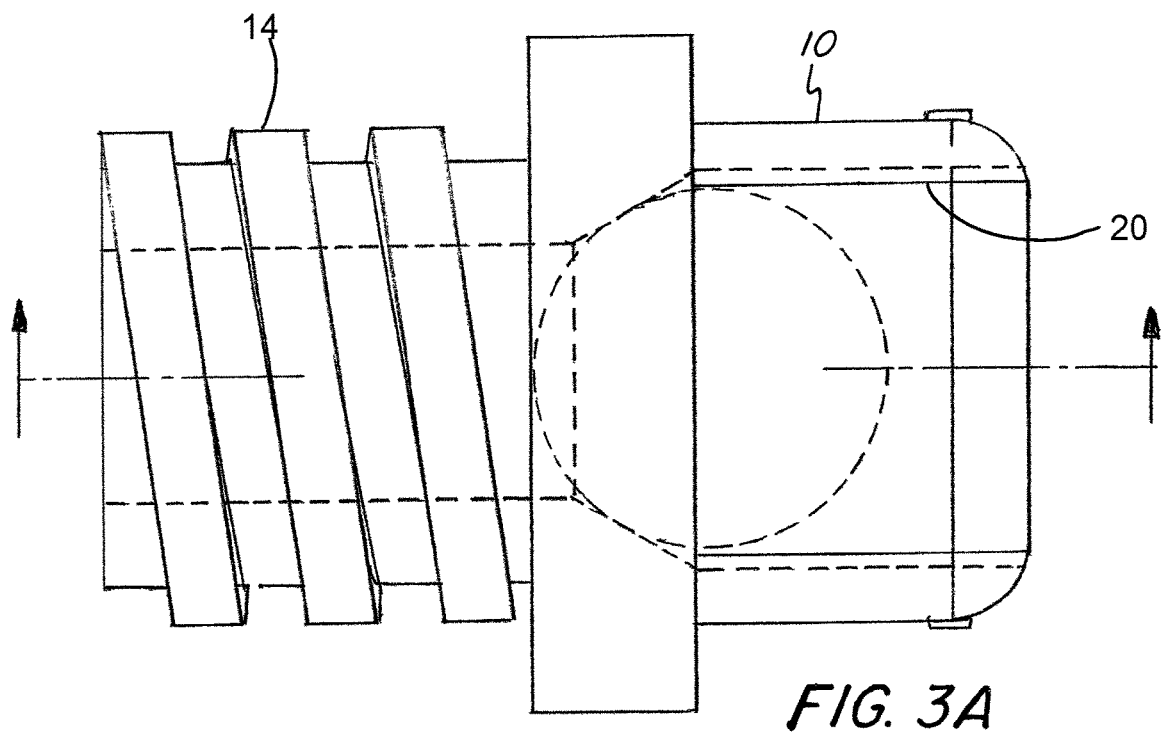
FIG. 3a is a side view of an embodiment of the check valve.
Figure 3B:
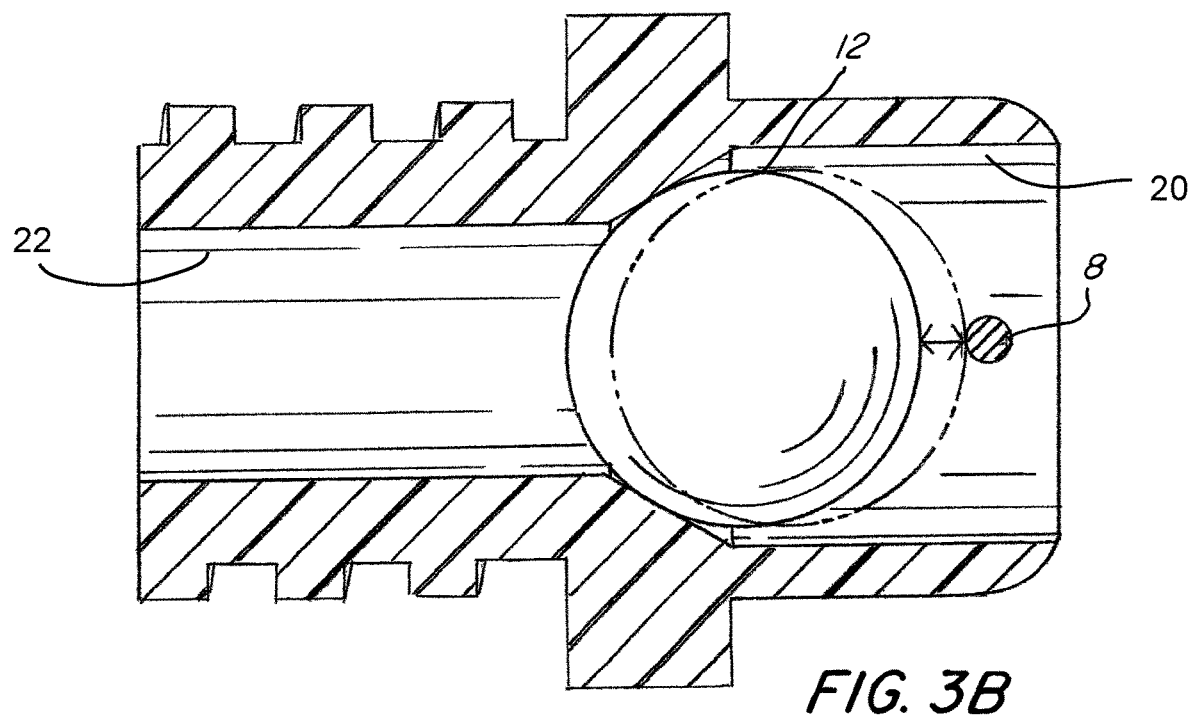
FIG. 3b is a cutaway view of an embodiment of the check valve.

As seen in FIG. 3b, valve body 6 includes at least two inner diameters (20 and 22). The two inner diameters can be concentric. This design helps ensure ease in manufacturing and maintenance. As stopper 12 moves within valve body 6 an outer surface of stopper 12 can seal to an inner surface of the valve body 6 in the first position. Stopper 12 can also seal to a shoulder surface within valve body 6. Having a shoulder on the inner surface of valve body 6 allows stopper 12 to better mate with the valve body 6 and seal in the closed position.

Figure 4A:
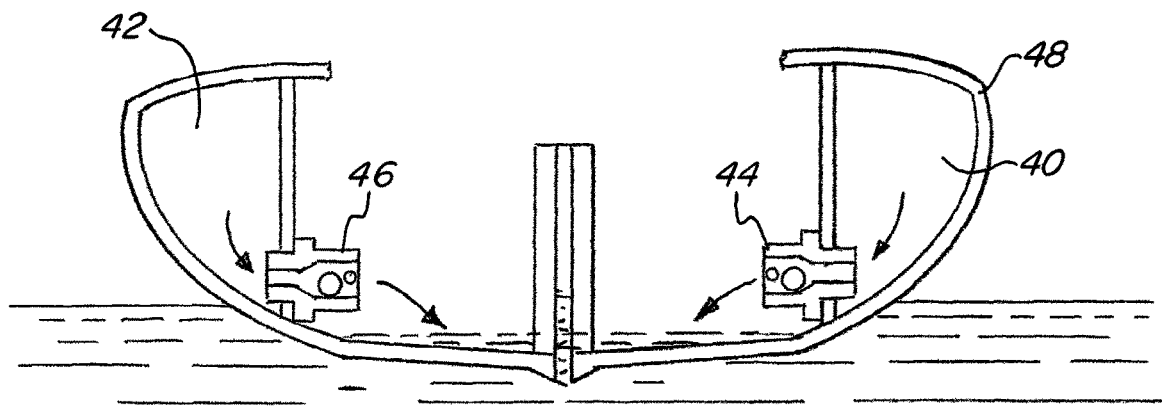
FIG. 4a-c is a cut away view of a rocking vessel with an embodiment of the check valve in use.
Figure 4B:
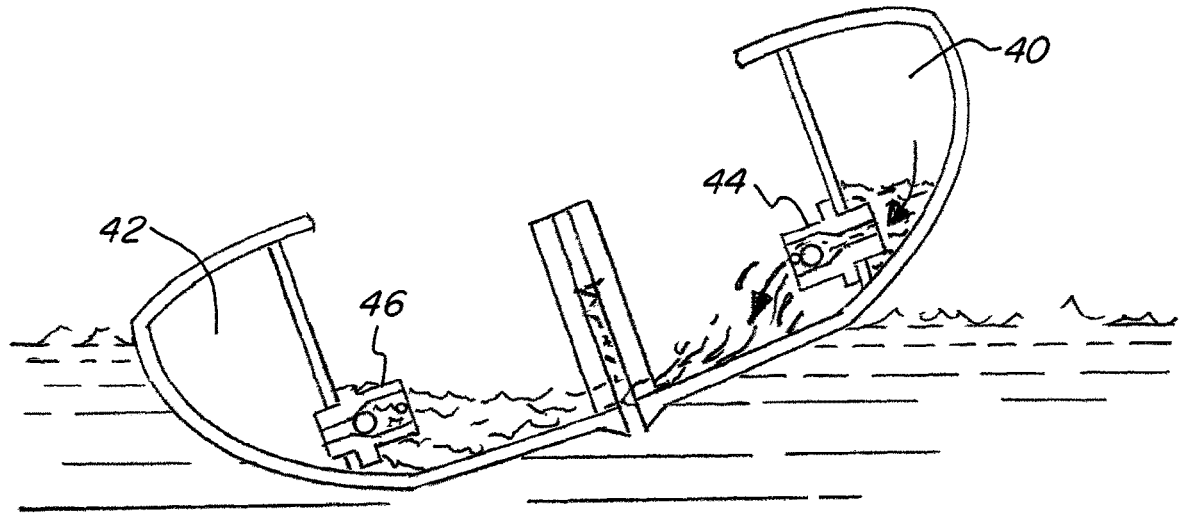
Figure 4C:
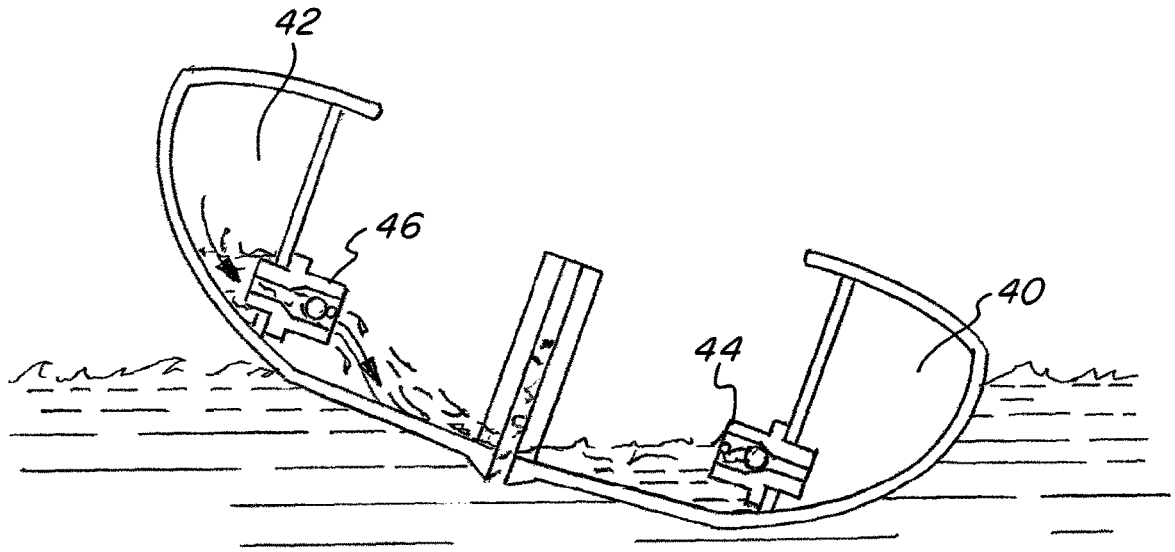

As seen in FIGS. 4a-4c, stopper 54 can be moveable from the second position to the first position by gravity. FIG. 4a shows opposing valves 46 and 44 leading to compartments 42 and 40 respectively, with vessel 48 in a neutral position. FIG. 4b shows vessel 48 keeling leftward such that compartment 40 is raised and compartment 42 is lowered in relation to a water line. In this keeled state, valve 46 in a closed position and valve 44 in an open position. Water collected in vessel 48 can pour from compartment 40 and is blocked from pouring into compartment 42 by the stopper. Further, FIG. 4c shows vessel 48 keeling rightward such that compartment 42 is raised and compartment 40 is lowered in relation to a water line. In this keeled state, valve 44 in a closed position and valve 46 in an open position. Water collected in vessel 48 can pour from compartment 42 and is blocked from pouring into compartment 40 by the stopper.

The stopper can also move from an open position to a closed position by gravity. The stopper can be denser than water, such that the stopper is not affected by buoyancy forces. The stopper can also move from the closed position to the open position by gravity. Alternatively, the stopper can move between positions by hydrostatic pressure forces. When more water has collected in either compartment than water outside the compartment the stopper will be pressured into an open position, allowing water to flow out. This allows the water to be let out even when then vessel 48 is in a neutral position.

Figure 5A:
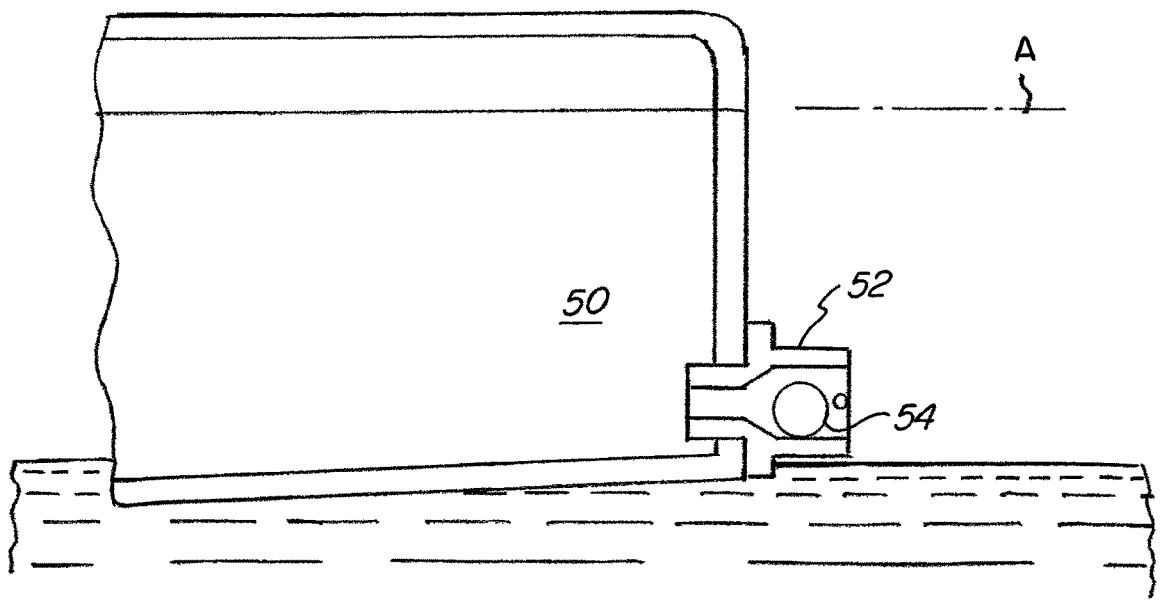
Figure 5B:
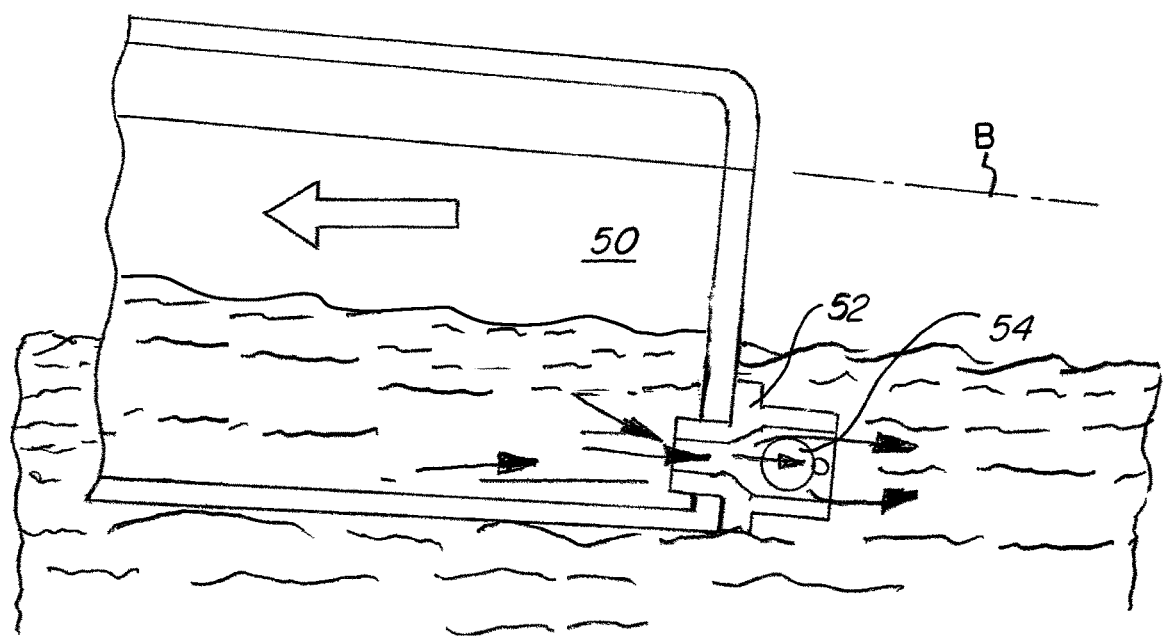

FIGS. 5a-c show the check valve being used in an outboard situation. FIG. 5a shows the vessel in a neutral position. FIG. 5b shows a vessel with compartment 50 having a large amount of water. As the level of water in compartment 50 is higher than the amount of water overboard, water flows out due to hydrostatic pressure. The arrow depicts the motion of the vessel. With the vessel pitching upwards, stopper 54 is also acted upon by gravity. If the vessel slows or stops, and the vessel pitches forward, as shown in FIG. 5c, stopper 54 flows into a closed position. If overboard water is above the inside water line of the compartment, water will tend to rush in, but will be blocked by stopper 54. The vessel does not have to be pitched forward, and the stopper 54 does not have to be affected by gravity as the hydrostatic forces will have a greater effect on the position of the stopper.

Figure 6A:
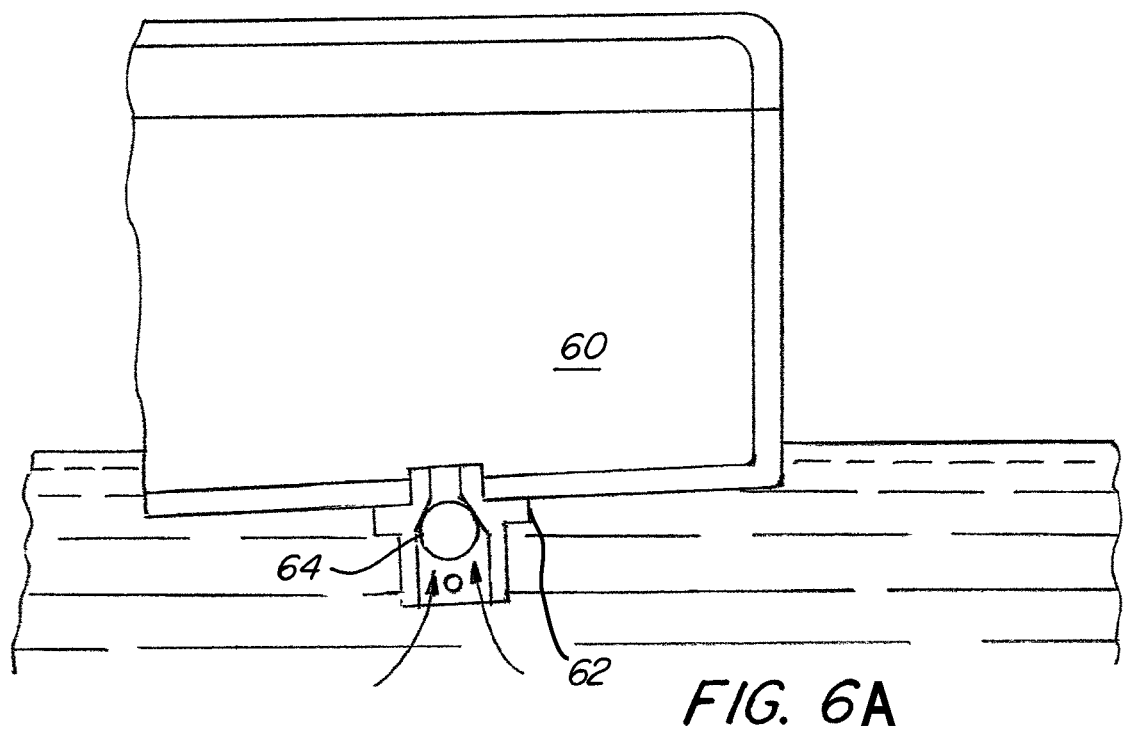
FIG. 6a-b is a cut away view of a vessel with an embodiment of the check valve in use.
Figure 6B:
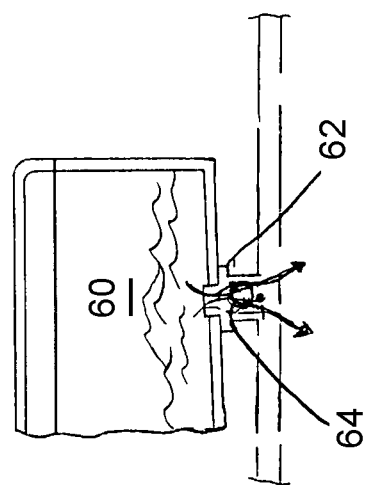

Alternatively, stopper 64 can be less dense than water, as seen in FIGS. 6a-b. Stopper 64 can then be moveable by flotation from an open position to a closed position, and by gravity from a closed position to an open position. Stopper 64 can also include hydrophobic and hydrophilic properties. The use of a hydrophobic material or coating can make stopper 64 react to incoming or outgoing water even faster.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A check valve assembly comprising:
    a first buoyancy chamber of a vessel having a first port;
    a first valve body fitted to sealingly engage said first port;
    a first stopper retained within said first valve body and moveable to a first position, limiting water from entering said first port, to a second position permitting drainage of water from said first port;
    the first stopper retained within said first valve body such that it is moved to the first position when the first buoyancy chamber is tilted such that the first valve body is angled up from a horizontal position;
    the first stopper retained within said first valve body such that it is moved to the second position when the first buoyancy chamber is tilted such that the first valve body is angled down from a horizontal position.

2. The check valve assembly of claim 1 further comprising:
    a second buoyancy chamber of the vessel having a second port;
    a second valve body fitted to sealingly engage said second port;
    a second stopper retained within said second valve body and moveable to a first position, limiting water from entering said second port, to a second position permitting drainage of water from said second port;
    the second stopper retained within said second valve body such that it is moved to the second position when the first buoyancy chamber is tilted such that the first valve body is angled up from a horizontal position;
    the second stopper retained within said second valve body such that it is moved to the first position when the first buoyancy chamber is tilted such that the first valve body is angled down from a horizontal position.

3. The check valve a assembly of claim 2, wherein said first and second ports include a threaded surface.

4. The check valve assembly of claim 2, wherein said first and second valve bodies include a threaded outer surface for sealingly engaging said first and second ports.

5. The check valve assembly of claim 2, wherein drain plugs are removed from said first and second ports and replaced with said first and second valve bodies.

6. The check valve assembly of claim 2, wherein said stoppers are retained in said first and second valves by pins.

7. The check valve assembly of claim 2, wherein said first and second valve bodies are unitary pieces.

8. The check valve assembly of claim 2, wherein said first and second valve bodies include at least two inner diameters.

9. The check valve assembly of claim 2, wherein said first and second stoppers are balls.

10. The check valve assembly of claim 2, wherein an outer surface of said first stopper and said second stopper seals, respectively, to an inner surface of said first valve body and said second valve body in the first position.

11. The check valve assembly of claim 2, wherein an outer surface of said first stopper and said second stopper seals, respectively, to a shoulder surface within said first valve body and said second valve body in the first position.

12. The check valve assembly of claim 2, wherein said first and second stoppers are moveable from the first position to the second position by gravity.

13. The check valve assembly of claim 12, wherein said first and second stoppers are moveable from the second position to the first position by gravity.

14. The check valve assembly of claim 12, wherein said first and second stoppers are denser than water.

15. The check valve assembly of claim 12, wherein said first and second stoppers are moveable by floatation from the second position to the first position.

16. The check valve assembly of claim 15, wherein said first and second stoppers are less dense than water.

17. The check valve assembly of claim 2, wherein said vessel is a boat.

18. The check valve assembly of claim 2, wherein the first and second ports include a pair of opposing ports each having a valve body therein.

19. The check valve assembly of claim 2, wherein the first and second stoppers are moved by hydrostatic pressure.

20. The check valve assembly of claim 1, comprising:
the first buoyancy chamber being at least partially submerged in water;
the first stopper in the first valve body such that it is moved to the first position when the level of the water inside of the compartment is lower than the level of the water outside of the compartment;
the first stopper in the valve body such that it is moved to the second position when a level of water inside the first buoyancy chamber is higher than a level of water outside of the first buoyancy chamber.

* * * * *